United States Patent
Han et al.

(10) Patent No.: US 12,221,029 B2
(45) Date of Patent: Feb. 11, 2025

(54) DMD LAMP AND METHOD OF CONTROLLING DMD LAMP

(71) Applicant: HYUNDAI MOBIS CO., LTD., Seoul (KR)

(72) Inventors: Seong Yeon Han, Osan-si (KR); Myeong Je Kim, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 128 days.

(21) Appl. No.: 18/146,411

(22) Filed: Dec. 26, 2022

(65) Prior Publication Data

US 2023/0219486 A1 Jul. 13, 2023

(30) Foreign Application Priority Data

Jan. 12, 2022 (KR) .......................... 10-2022-0004492

(51) Int. Cl.
*B60Q 1/14* (2006.01)
*B60Q 11/00* (2006.01)

(52) U.S. Cl.
CPC .......... *B60Q 1/1423* (2013.01); *B60Q 11/005* (2013.01); *B60Q 2300/30* (2013.01)

(58) Field of Classification Search
CPC .......... B60Q 1/2665; B60Q 1/22; B60Q 1/50; B60Q 1/5037; B60Q 1/54; B60Q 1/543; B60Q 3/258
See application file for complete search history.

(56) References Cited

U.S. PATENT DOCUMENTS

| | | | |
|---|---|---|---|
| 6,969,183 B2 | 11/2005 | Okubo et al. | |
| 2018/0136337 A1* | 5/2018 | Zohar | G01S 7/497 |
| 2018/0328563 A1* | 11/2018 | Park | G06V 20/56 |
| 2019/0176683 A1* | 6/2019 | Lim | B60Q 1/143 |
| 2019/0361235 A1* | 11/2019 | Fukushima | B60K 35/00 |

FOREIGN PATENT DOCUMENTS

KR 20120054159 A 5/2012

OTHER PUBLICATIONS

Office Action issued Aug. 22, 2023 in corresponding German Patent Application No. 10 2022 214 410.4.

* cited by examiner

*Primary Examiner* — Wei (Victor) Y Chan
(74) *Attorney, Agent, or Firm* — NovoTechIP International PLLC

(57) ABSTRACT

The present invention relates to a lamp system including a digital micro-mirror device (DMD) module, and more particularly, to a system and method for improving life characteristics of a DMD module. A DMD lamp and a method of controlling a DMD lamp of the present invention may improve a life of a DMD module by measuring a temperature of the DMD module in real time and controlling operations of the DMD module and a light source when the temperature of the DMD module rises above a certain temperature, and improve the life of the DMD module by adjusting a ratio of an ON mode/OFF mode of the DMD module to the same ratio and automatically compensating for the insufficient amount of light to reduce the consumption of an angle adjusting unit of a mirror to a minimum while maintaining the output amount of light.

14 Claims, 6 Drawing Sheets

DMD LAMP AND METHOD OF CONTROLLING DMD LAMP

CROSS-REFERENCE TO RELATED APPLICATIONS

This application claims priority under 35 U.S.C. § 119 to Korean Patent Application No. 10-2022-0004492, filed on Jan. 12, 2022, in the Korean Intellectual Property Office, the disclosure of which is incorporated herein by reference in its entirety.

TECHNICAL FIELD

The following disclosure relates to a lamp system including a digital micro-mirror device (DMD) module, and more particularly, to a system and method for improving life characteristics of a DMD module.

BACKGROUND

A technology using the current digital micro-mirror device (hereinafter, referred to as DMD) is a technology that realizes the desired image/video by controlling an integrated mirror of hundreds of thousands to millions of μm, and is mainly used for a display such as a projector, and is a trend that is expanding its application range to vehicles in recent years. When applied to a vehicle, the DMD is applied to a head up display (HUD), a vehicle head lamp, and the like and serves to enable a beam pattern to be varied with a higher degree of freedom without using a complex structure.

However, the conventional DMD has a problem of somewhat reducing heat resistance because it includes a micro-mirror and a micro-sized driver for changing an angle of the micro-mirror. The life of the conventional DMD is affected from 105 □C, and accordingly, the DMD is sensitive to external temperature and illuminance, and when the amount of light received from a light source is large or the temperature of the light source itself is high, since the temperature of the DMD easily rises by the influence, caution is needed in managing the life of the DMD.

In addition, in the case of the conventional DMD, the inclination of the mirror had to be changed repeatedly to reflect or block the light from the light source to the lens. When a balance of an ON mode, in which light is reflected to a lens, and an OFF mode, in which light is not reflected to the lens, is biased to one side, an imbalance in a hinge part that adjusts the angle of the mirror may occur, which may also affect the life of the DMD.

SUMMARY

An embodiment of the present invention is directed to providing a digital micro-mirror device (DMD) lamp capable of improving a life of a DMD module by measuring a temperature of the DMD module in real time and automatically stopping an operation of the DMD module when the temperature of the DMD module rises above a heat-resistant temperature, and a method of controlling a DMD lamp.

Another embodiment of the present invention is directed to providing a DMD lamp capable of improving a life of a DMD module by adjusting a ratio of an ON mode/OFF mode of the DMD module to the same ratio and automatically compensating for the insufficient amount of light to reduce the consumption of an angle adjusting unit of a mirror to a minimum while maintaining the output amount of light, and a method of controlling a DMD lamp.

Still another embodiment of the present invention is directed to providing a DMD lamp capable of improving a life of a DMD module by monitoring a temperature of a light source irradiating light to the DMD module in real time and downward correcting the target amount of light of the light source stepwise when the temperature rises to minimize an effect of heat of the light source on the DMD module, and a method of controlling a DMD lamp.

Still yet another embodiment of the present invention is directed to providing a DMD lamp capable of reducing unnecessary overuse and improving a life of a DMD module by receiving environmental information from various sensors provided in a vehicle and setting an ON/OFF ratio and the target amount of light of the DMD module as efficiently as possible, and a method of controlling a DMD lamp.

In one general aspect, a digital micro-mirror device (DMD) lamp provided in a mobility device may include: a light source that irradiates light; a DMD module that includes two or more mirrors for receiving light from the light source and reflecting the light to a lens, and an angle adjusting unit for adjusting an angle of the mirror to adjust the target amount of light reflected to the lens; and a control unit that calculates the target amount of the light source and a light transmission ratio which is a ratio at which the DMD module transmits the light to the lens, based on received environmental information to control the angle adjusting unit and the light source of the DMD module.

The environmental information may include at least one of distance information between the mobility device and an external object, access information of the external object, external illuminance information, moving speed information of the mobility device, location information of the mobility device, road information, precipitation information, and road surface information.

The control unit may decrease the target amount of light as the distance between the mobility device and the external object decreases, based on environmental information.

The control unit may decrease the target amount of light as external illuminance decreases, based on the environmental information.

The control unit may decrease the target amount of light as a speed of the mobility device decreases, based on the environmental information.

The control unit may set the target amount of light to a predetermined reference value without decreasing the amount of light if a precipitation is greater than 0, based on the environmental information.

The DMD lamp may further include a temperature sensor that provides a temperature of the DMD module and a temperature of the light source, in which the control unit may control the DMD module and the light source based on at least one of the temperature of the DMD module and the temperature of the light source that are received from the temperature sensor.

The control unit may control at least one of the DMD module and the light source so that an operation of at least one of the DMD module and the light source is stopped when the temperature of the DMD module exceeds a predetermined first reference temperature of DMD module, and provide warning information.

The control unit may decrease the light transmission ratio and set the light transmission ratio to 50%, when the temperature of the DMD module is lower than or equal to a predetermined first reference temperature of DMD module, but is higher than or equal to a predetermined second reference temperature of DMD module lower than the first reference temperature of DMD module.

The control unit may set the light transmission ratio to be within a predetermined error range centered on 50%, when the temperature of the DMD module is lower than or equal to the predetermined first reference temperature of DMD module but is higher than or equal to the predetermined second reference temperature of DMD module lower than the first reference temperature of DMD module, and the temperature of the light source is lower than or equal to a reference module of the light source, and correct the amount of light of the light source so that the amount of light output to the lens is kept constant even when the light transmission ratio is changed.

The control unit may set the light transmission ratio to be within a predetermined error range with respect to 50%, when the temperature of the DMD module is lower than or equal to the predetermined first reference temperature of DMD module but is higher than or equal to the predetermined second reference temperature of DMD module lower than the first reference temperature of DMD module, and the temperature of the light source exceeds a reference module of the light source, correct the target amount of light of the light source so that the amount of light of the light source is maintained or decreases stepwise, and transmit warning information.

The DMD lamp may further include an active heat dissipation unit that dissipates heat of the DMD module, in which the control unit may control the active heat dissipation unit so that the temperature of the DMD module is lower than the second reference temperature of DMD module when the temperature of the DMD module is higher than or equal to the predetermined second reference temperature of DMD module lower than the predetermined first reference temperature of DMD module.

The control unit may monitor the temperature of the light source in real time when the temperature of the light source exceeds a reference temperature of the light source, and decrease the target amount of current applied to the light source stepwise so that the monitored temperature value of the light source is lower than or equal to the reference temperature of the light source.

In another general aspect, a method of controlling a digital micro-mirror device (DMD) lamp provided in a mobility device may include, by a control unit, (a) receiving environmental information, (b) setting the target amount of light of a light source, (c) setting a light transmission ratio of each mirror included in a DMD module, (d) receiving a temperature of the light source and a temperature of the DMD module, and when at least one of the temperature of the light source or the temperature of the DMD module exceeds the predetermined first reference temperature of DMD module or is within a predetermined error range of the first reference temperature of DMD module, (e) controlling the light source and the DMD module to adjust the temperature.

In (a), the environmental information may include at least one of access information of an external object, external illuminance information, moving speed information of the mobility device, location information of the mobility device, road information, precipitation information, and road surface information, and the control unit may set the target amount of light of the light source and a light transmission ratio of the DMD module based on environmental information in (b) and (c).

(e) may include, by the control unit, (e1) blocking a current applied to the light source or the DMD module, and (e2) generating a warning message to the outside, when the temperature of the DMD module received in (e) exceeds the predetermined first reference temperature of DMD module.

(e) may include (e3) controlling, by the control unit, an angle adjusting unit so that the light transmission ratio of the DMD module is within a predetermined error range centered on 50% when the temperature of the DMD module received in (d) is lower than or equal to the first reference temperature of DMD module, and is higher than or equal to the second reference temperature of DMD module lower than the first reference temperature of DMD module.

(e) may include, after (e3), (e4) correcting the target amount of light of the light source so that an amount of light value output to a lens is maintained when the temperature of the light source received in (d) is lower than or equal to a reference temperature of the light source.

(e) may further include (e5) controlling, by the control unit, an active heat dissipation unit so that the temperature of the DMD module is lower than the second reference temperature of DMD module, when the temperature of the DMD module received in (d) is higher than or equal to the predetermined second reference temperature of DMD module lower than the first reference temperature of DMD module.

(e) may include, by the control unit, when the temperature of the light source received in (d) exceeds a reference temperature of the light source, (e6) outputting a warning message to the outside, (e7) lowering the amount of current of the light source by the predetermined amount of 1 unit, and e8) receiving the temperature of the light source at the amount of current lowered in (e7), in which (e6) to (e8) may be alternately repeated, and when it is determined in step (e8) that the temperature of the light source is lower than or equal to the reference temperature of the light source, the repetition of (e6) to (e8) may end.

DETAILED DESCRIPTION

Hereinafter, the technical spirit of the present invention will be described in more detail with reference to the accompanying drawings. Terms and words used in the present specification and claims are not to be construed as a general or dictionary meaning, but are to be construed as meaning and concepts meeting the technical ideas of the present invention based on a principle that the present inventors may appropriately define the concepts of terms in order to describe their inventions in best mode.

Hereinafter, a basic configuration of a DMD lamp 1000 of the present invention will be described with reference to FIGS. 1 to 4.

Figure 1:
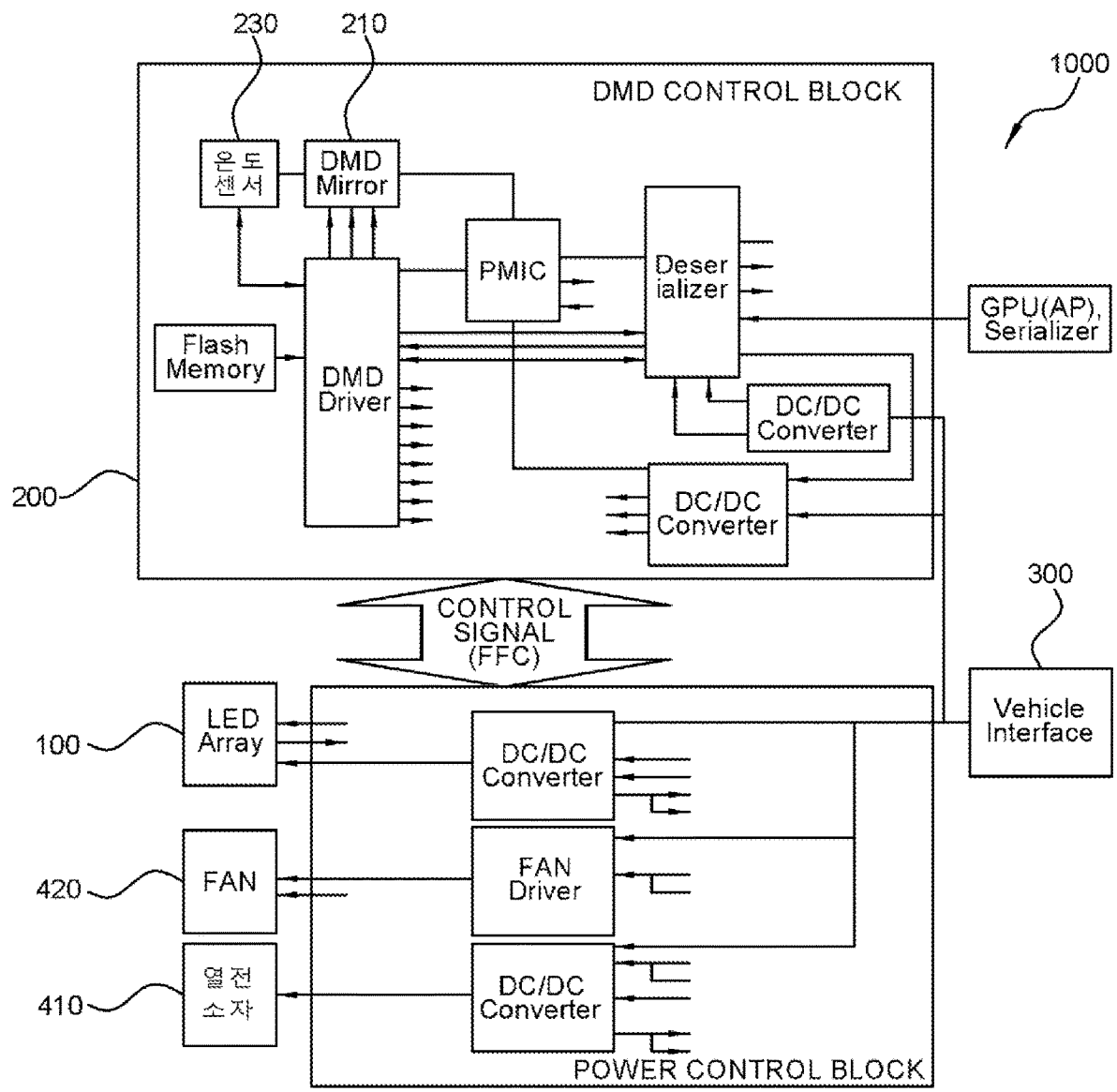
FIG. 1 is a block diagram illustrating a DMD lamp of the present invention and a control system for controlling the same.

As illustrated in FIG. 1, the present invention is a digital micro-mirror device (DMD) lamp provided in a mobility device (i.e., moving body) V. The DMD lamp may include a light source 100 that irradiates light and a DMD module 200 that receives light from the light source 100 and reflects the light to a lens. In addition, the DMD lamp 1000 of the present invention may include a control unit 300 that controls the light source 100 and the DMD module 200. The control unit 300 calculates the target amount of light of the light source 100 and a light transmission ratio, which is a ratio at which the DMD module 200 transmits light to the lens, based on the received environmental information, and controls the DMD module 200 and the light source 100. In this case, the light transmission ratio means a ratio of an ON mode and OFF mode of each mirror 210 included in the DMD module 200. The control unit 300 may adjust the light transmission ratio of the light source 100 and the DMD module 200 to adjust the temperature of the DMD module 20, thereby improving durability performance and life.

In addition, the DMD lamp 1000 of the present invention may include a DC/DC converter, a DMD driver that transmits a control signal to the DMD module 200, a deserializer and a serializer that convert serial data and a parallel interface to transmit a signal to a DMD driver, and a power management integrated circuit (PMIC) that manages power. Also, the DMD lamp 1000 may include a temperature sensor 230 attached to the DMD module 200 and a thermoelectric device 410 or a fan 420 controlled according to a temperature value of the temperature sensor 230.

Figure 2:
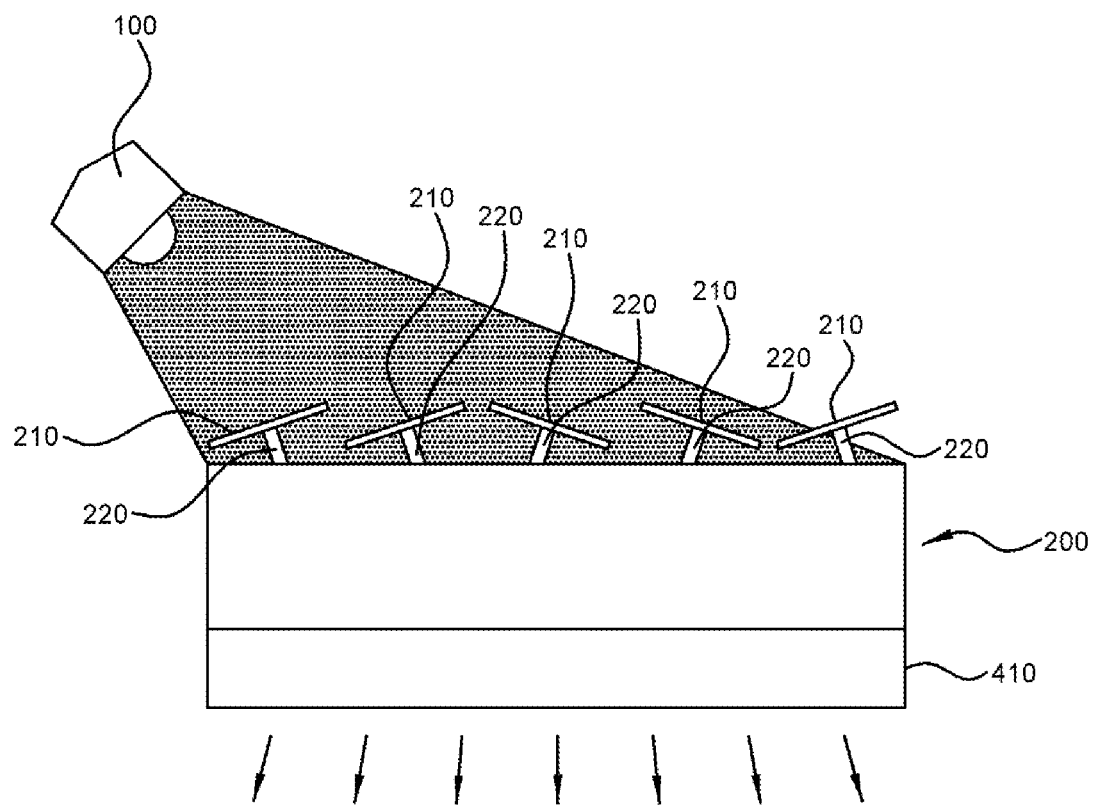
FIG. 2 is a schematic diagram illustrating an operation of the DMD module of the present invention.

In addition, as illustrated in FIG. 2, the DMD module 200 of the present invention includes a plurality of mirrors 210 and an angle adjusting unit 220 that adjusts angles of the mirrors 210 to adjust the target amount of light reflected to the lens. The angle adjusting unit 220 may be controlled by receiving a control signal from the above-described DMD driver.

In addition, the DMD lamp 1000 of the present invention may further include an active heat dissipation unit 400 that dissipates heat of the DMD module 200. The active heat dissipation unit 400 may be controlled by the control unit 300, and may operate by the control unit 300 by receiving a current when the temperature of the DMD module 200 and the light source 100 is higher than or equal to a predetermined temperature. In this case, it is preferable that the active heat dissipation unit 400 includes at least one of the thermoelectric device 410 and the fan 420 described above, and an active air flap. When the thermoelectric device 410 is included, as illustrated in FIG. 2, it is preferable that the thermoelectric device 410 is directly attached to the DMD module 200 to dissipate heat from the DMD module 200 to the outside.

Figure 3:
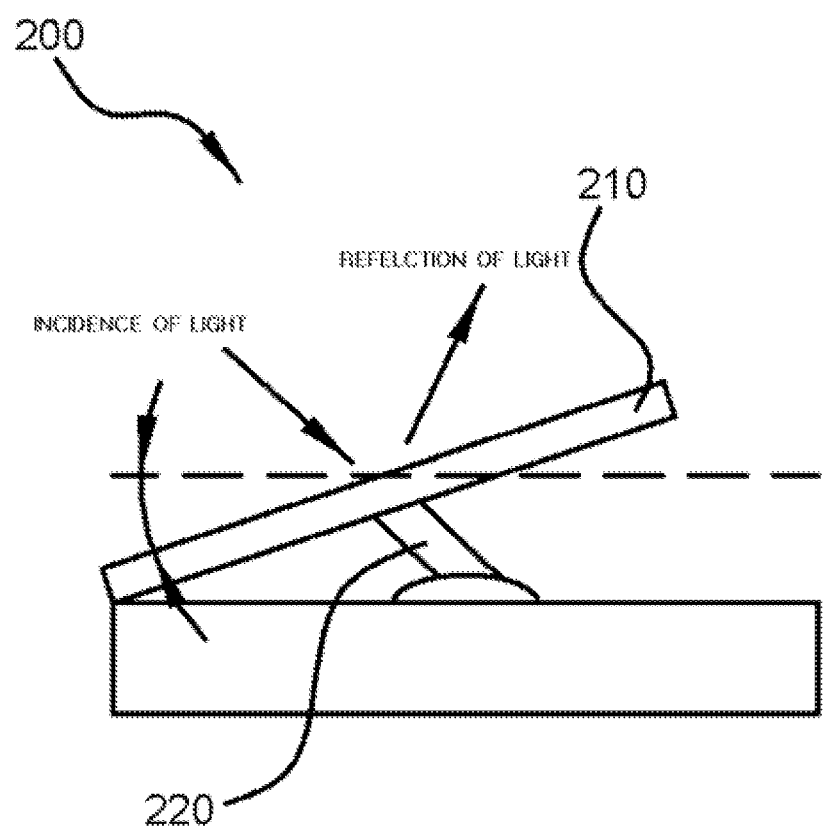
FIG. 3 is a schematic diagram showing an ON mode of an active heat dissipation unit of the present invention.
Figure 4:
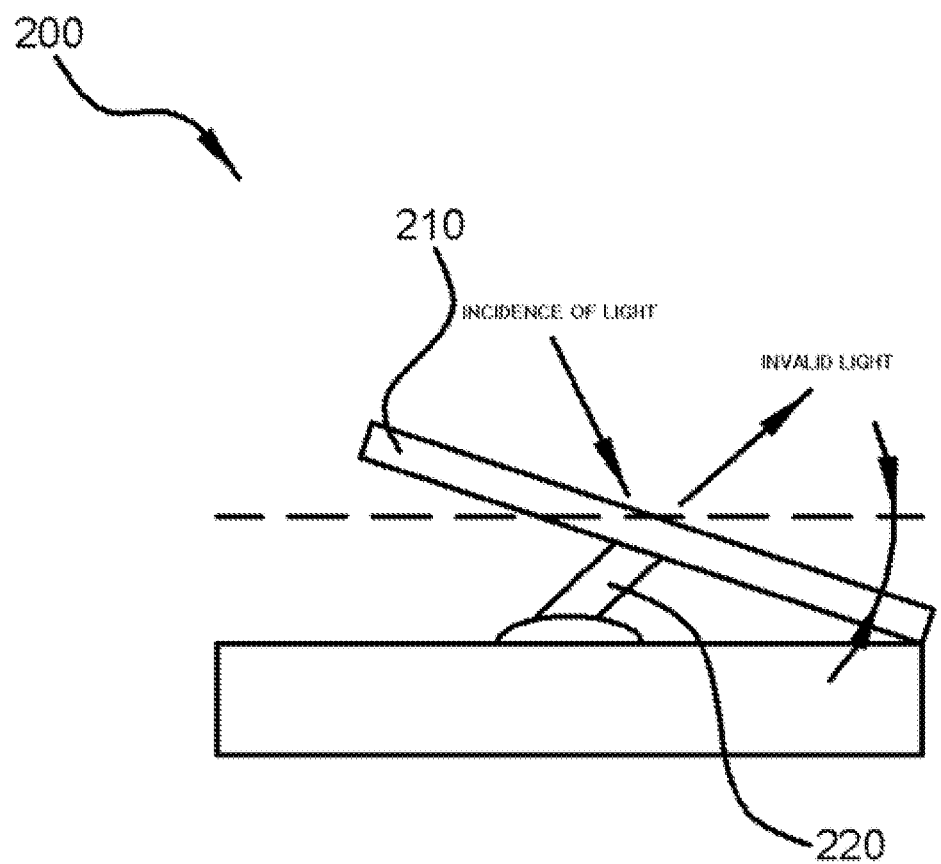
FIG. 4 is a schematic diagram illustrating an OFF mode of the active heat dissipation unit of the present invention.

In addition, to describe the light transmission ratio of the DMD module 200 in more detail, the light transmission ratio is the ratio of the ON mode and the OFF mode of each mirror 210 included in the DMD module 200. As illustrated in FIGS. 3 and 4, according to phases of each mirror 210 of the DMD module 200 of the present invention, the ON mode (FIG. 3) in which the mirror 210 of the DMD module 200 forms a first angle with the light source 100 and transmits light to the lens and the OFF mode (FIG. 4) in which the mirror 210 forms a second angle with the light source 100 not to transmit light to the lens are present, and the light transmission ratio to be described below indicates a ratio of the ON mode holding time in the total time.

Hereinafter, the environmental information received by the control unit 300 will be described in more detail.

The control unit 300 may be interlocked with a sensor of the mobility device V to which the DMD lamp 1000 of the present invention is applied, and the environmental information may be received from the sensor provided in the mobility device V. The control unit 300 may receive the environmental information and calculate the target amount of light of the light source 100 and the light transmission ratio of the DMD module 200 to minimize unnecessary driving of the DMD lamp 1000. It is preferable that the environmental information includes at least one of distance information and access information between the mobility device V and an external object received from the radar/Lidar sensor of the mobility device V, external illuminance information received from an illuminance sensor of the mobility device V, moving speed information of the mobility device V received from a navigation sensor of the mobility device V, location information and road/road surface information of the mobility device V, and precipitation information received from a rain sensor of the mobility device V.

It is preferable that the control unit 300 calculates the target amount of light of the light source 100 and the light transmission ratio of the DMD module 200 according to a reference value of each environmental information that is stored in advance. In more detail, it is preferable that the control unit 300 decreases the target amount of light of the light source 100 as the external illuminance received from the illuminance sensor decreases. In addition, it is preferable that the control unit 300 decreases the target amount of light as the speed of the mobility device V received from the navigation sensor decreases. In addition, it is preferable that the control unit 300 sets the target amount of light to a predetermined reference value without reducing the target amount of light when the target amount of external precipitation received from the rain sensor is greater than 0.

Here, it is preferable that the control unit 300 determines whether the mobility device V moves straight or in a curve according to a moving path of the mobility device V or a direction of a head of the mobility device V received from the navigation sensor, and sets the target amount of light differently when the mobility device V moves straight and in a curve, respectively. In this case, it is preferable to set the target amount of light of the light source 100 to be smaller when the mobility device V is moving straight compared to when the mobility device V is moving in a curve. However, when the temperature of the DMD module 200 is close to an upper limit and the temperature of the light source 100 is higher than or equal to the upper limit, the target amount of light when moving in a curve is lowered to the target amount of light when moving straight, so it is preferable to make the target amount of light the same for the curve and straight movement.

In addition, it is preferable that the control unit 300 controls the target amount of light of the light source 100 faster and/or more as the distance between the mobility device V received from the radar/LiDAR sensor and the external object is shorter and the access speed of the external object is higher. In more detail, when the access speed of the external object is greater than or equal to a predetermined reference value, it is preferable to increase a decrease width of at least one of the target amount of light of the light source 100 and the light transmission ratio of the DMD module 200.

In this way, by adjusting the target amount of light of the light source 100 and the light transmission ratio of the DMD module 200 according to the environmental information, unnecessary driving of the DMD module 200 may be reduced, and an average amount of irradiated light may be reduced to increase the ease of temperature control, thereby increasing the service life of the DMD module 200.

Hereinafter, when the temperature of the DMD module 200 or the light source 100 rises, a temperature control algorithm of the control unit 300 will be described in more detail.

The DMD lamp 1000 of the present invention may further include a temperature sensor 230 that provides the temperature of the DMD module 200 and the temperature of the light source 100. The temperature sensor 230 may be attached to the surface of the DMD module 200 and the surface of the light source 100 to receive the surface temperatures of the DMD module 200 and the light source 100. It is preferable that the control unit 300 controls the DMD module 200 and the light source 100 based on at least one of the temperature of the DMD module 200 and the temperature of the light source 100 received from the temperature sensor 230.

The control unit 300 may control at least one of the DMD module 200 and the light source 100 so that, when the temperature of the DMD module 200 exceeds a predetermined first reference temperature of DMD module, the operation of at least one of the DMD module 200 and the light source 100 is stopped. In particular, in this case, the DMD module 200 may be shut down by blocking the current applied to the DMD module 200. In addition, it is preferable to provide warning information. The warning information may be provided to passengers of the mobility device V, and it is preferable to turn on a warning light on an instrument panel or transmit a warning sound. In this way, by controlling the light source 100 and the DMD module 200, the DMD lamp 1000 of the present invention may prevent the DMD module 200 from being damaged at an elevated temperature.

In addition, when the temperature of the DMD module 200 is lower than or equal to a first reference temperature of DMD module, and is higher than or equal to a predetermined second reference temperature of DMD module lower than the first reference temperature of DMD module, it is preferable to downward adjust the light transmission ratio of the DMD module 200. In more detail, it is preferable to set the light transmission ratio to 50%. Accordingly, the holding times of the on mode and the off mode of the mirror 210 are maintained to be identical to each other, so the consumption of the angle adjusting unit 220 may decrease to a minimum.

In this case, the control unit 300 may adjust the target amount of light of the light source 100 upward as much as the light transmission ratio is adjusted downward to keep the amount of output light transmitted to the lens constant. However, in this case, it is preferable that the control unit 300 receives the temperature of the light source 100 from the temperature sensor 230 to adjust the target amount of light of the light source 100 upward only when the temperature of the light source 100 is lower than or equal to the light source 100 reference temperature.

On the other hand, when the temperature of the light source 100 received by the control unit 300 from the temperature sensor 230 exceeds the reference temperature of the light source 100, it is preferable that the control unit 300 corrects the target amount of light of the light source 100 so that the amount of light of the light source 100 is maintained or decreases stepwise and provides warning information. In more detail, as the difference between the current temperature of the light source 100 and the reference temperature of the light source 100 increases, it is preferable to downward correct the target amount of light of the light source 100 stepwise, and when the current temperature of the light source 100 is within an error range of the reference temperature of the light source 100, it is preferable to maintain the target amount of light of the light source 100.

Also, in this case, the control unit 300 lowers the target amount of light when the mobility device is moving in a curve and the target amount of light of the light source 100 to the target amount of light when the mobility device V is moving in a straight line, so it is preferable to reduce the operation of the DMD lamp 1000 to a minimum by making the target amount of light the same during the curve and straight movement.

In addition, the DMD lamp 1000 further includes an active heat dissipation unit 400 for dissipating heat of the DMD module 200, and it is preferable that the control unit 300 operates the active heat dissipation unit 400 by applying a current to the active heat dissipation unit 400 so that the temperature of the DMD module 200 is lower than the second reference temperature of DMD module when the temperature of the DMD module 200 is higher than or equal to the predetermined second reference temperature of DMD module lower than the first reference temperature of DMD module Thereafter, when the temperature of the DMD module 200 is lower than the second reference temperature of DMD module, it is preferable to block a current applied to the active heat dissipation unit 400.

In addition, when the temperature of the light source 100 is higher than or equal to the predetermined reference temperature of the light source 100, the control unit 300 controls the amount of light of the light source 100 so that the temperature value of the light source 100 is lower than the reference temperature of the light source 100. In more detail, when the temperature of the light source 100 exceeds the reference temperature of the light source 100, the temperature of the light source 100 is monitored in real time, and it is preferable to stepwise decrease the amount of current applied to the light source 100 by a preset unit amount so that the monitored temperature value of the light source 100 is equal to or lower than the reference temperature of the light source 100. It is preferable that the control unit 300 adjusts the target amount of light of the light source 100 until the temperature of the light source 100 drops to be lower than or equal to the reference temperature of the light source 100.

Hereinafter, a method for controlling a DMD lamp of the present invention will be described in more detail with reference to FIGS. 5 to 6.

Figure 5:
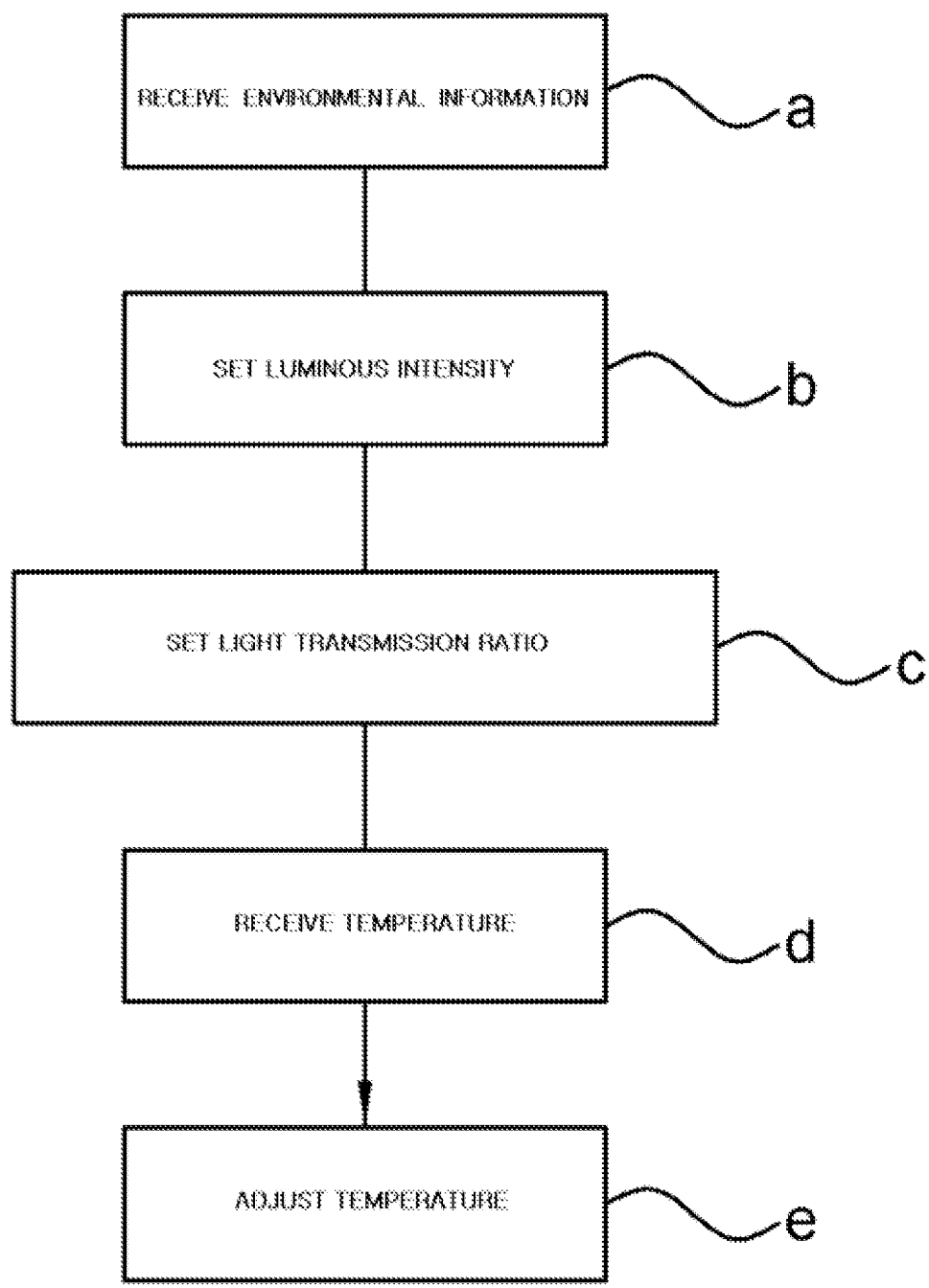
FIG. 5 is a schematic diagram illustrating a method of controlling a DMD lamp of the present invention.

As illustrated in FIG. 5, the present invention provides a method for controlling a digital micro-mirror device (DMD) lamp, and the method preferably includes, by the control unit 300, (a) receiving environmental information; (b) setting a target luminous intensity of light of the light source 100; (c) setting the light transmission ratio of each mirror 210 included in the DMD module 200; (d) receiving the temperature of the light source 100 and the temperature of the DMD module 200, and when at least one of the temperature of the light source 100 or the temperature of the DMD module 200 exceeds the predetermined first reference temperature of DMD module or is within a predetermined error range of the first reference temperature of DMD module, (e) controlling the light source 100 and the DMD module 200 to adjust the temperature.

In addition, in (a), the environmental information includes at least one of the access information of the external object, the external illuminance information, the moving speed information of the mobility device V, the location information of the mobility device V, the road information, the precipitation information, and the road surface information, and the control unit 300 preferably sets the target amount of light of the light source 100 and the light transmission ration of the DMD module 200 based on the environmental information in (b) and (c).

Figure 6:
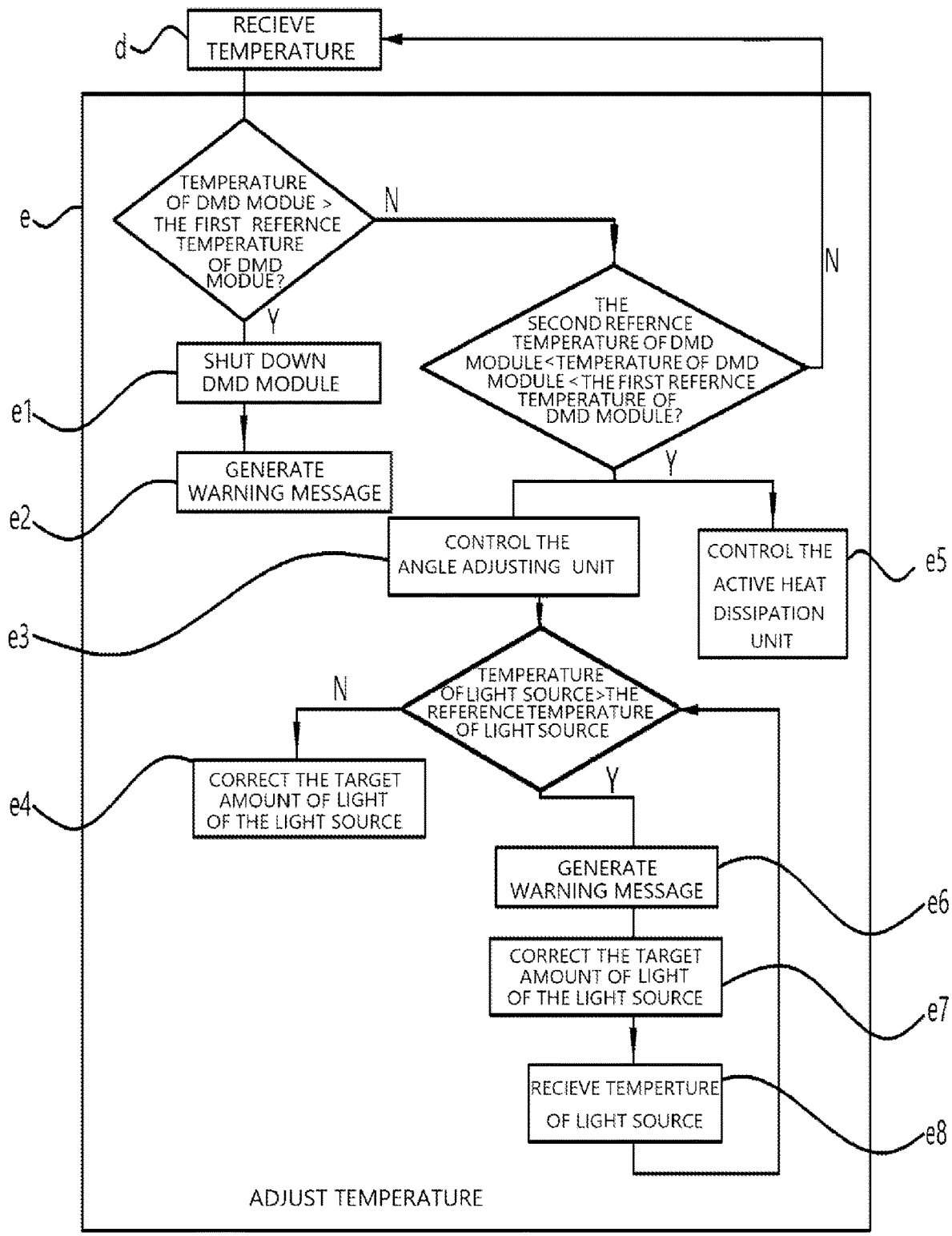
FIG. 6 is a flowchart illustrating detailed steps of a temperature control step in the method of controlling a DMD lamp of the present invention.

As illustrated in FIG. 6, (e) preferably includes, by the control unit 300, (e1) blocking a current applied to the light source 100 or the DMD module 200, and (e2) generating a warning (e.g., a warning notification or message) to the outside, when the temperature of the DMD module 200 received in (e) exceeds the predetermined first reference temperature of DMD module.

In addition, (e) may include (e3) controlling, by the control unit 300, the angle adjusting unit 220 so that the light transmission ratio of the DMD module 200 is within a predetermined error range centered on 50% when the temperature of the DMD module received in (d) is lower than or equal to the first reference temperature of DMD module, and is higher than or equal to the second reference temperature of DMD module lower than the first reference temperature of DMD module.

In this case, the control unit 300 may vary the control of the DMD lamp 1000 according to the temperature of the light source 100, and in more detail, (e) includes (e4) correcting the target amount of light of the light source 100 so that the value of the amount of light output to the lens is maintained after (e3) when the temperature of the light source 100 received in step (d) is lower than or equal to the reference temperature of the light source 100. On the other hand, (e) preferably further includes, by the control unit 300, (e5) controlling the active heat dissipation unit 400 so that the temperature of the DMD module 200 is lower than the second reference temperature of DMD module when the temperature of the DMD module received in (d) is higher than or equal to the predetermined second reference temperature of DMD module lower than the first reference temperature of DMD module.

In addition, (e) may include, by the control unit 300, when the temperature of the light source 100 received in (d) exceeds the reference temperature of the light source 100, (e6) outputting the warning message to the outside, (e7) lowering the amount of current of the light source 100 by a predetermined amount of 1 unit, (e8) receiving the temperature of the light source 100 at the amount of current lowered in (e7), in which (e6) to (e8) may be alternately repeated, and when it is determined in (e8) that the temperature of the light source 100 is lower than or equal to the reference temperature of the light source 100, the repetition of (e6) to (e8) preferably ends.

According to a DMD lamp and a method of controlling a DMD lamp of the present invention having the above configuration, it is possible to improve a life of a DMD module by measuring a temperature of the DMD module in real time and automatically stopping an operation of the DMD module when the temperature of the DMD module rises above a heat-resistant temperature.

In addition, it is possible to improve a life of a DMD module by adjusting a ratio of an ON mode/OFF mode of the DMD module to the same ratio and automatically compensating for the insufficient amount of light to reduce the consumption of an angle adjusting unit of a mirror to a minimum while maintaining the output amount of light.

In addition, it is possible to improve a life of a DMD module by monitoring a temperature of a light source irradiating light to the DMD module in real time and downward correcting a target amount of light of the light source stepwise when the temperature rises to minimize an effect of heat of the light source on the DMD module.

In addition, it is possible to reduce unnecessary overuse and improve a life of a DMD module by receiving environmental information from various sensors provided in a vehicle and setting an ON/OFF ratio and an amount of light of the DMD module as efficiently as possible.

The present invention should not be construed to being limited to the embodiment described above. The present invention may be applied to various fields and may be variously modified by those skilled in the art without departing from the scope of the present invention claimed in the claims. Therefore, it is obvious to those skilled in the art that these alterations and modifications fall in the scope of the present invention.

What is claimed is:

1. A digital micro-mirror device (DMD) lamp for a mobility device, comprising:
    a light source configured to irradiate light;
    a DMD module including (1) a plurality of mirrors configured to reflect the light irradiated from the light source to a lens and (2) an angle adjusting unit configured to adjust an angle of at least one of the plurality of mirrors to adjust a target amount of the light reflected to the lens; and
    a control unit configured to control the angle adjusting unit and the light source of the DMD module, wherein the control unit is configured to:
    receive environmental information; and
    calculate, based on the received environmental information, the target amount of the light reflected to the lens and a light transmission ratio at which the DMD module reflects the light irradiated from the light source to the lens,
    wherein the environmental information includes at least one of distance information between the mobility device and an external object, access information of the external object, external illuminance information, moving speed information of the mobility device, location information of the mobility device, road information, precipitation information, and road surface information, and
    wherein the control unit is configured to:
        decrease the target amount of the light in response to the distance information indicating that a distance between the mobility device and the external object has decreased;
        decrease the target amount of the light in response to the external illuminance information indicating that an external illuminance has decreased;
        decrease the target amount of the light in response to the moving speed information indicating that a speed of the mobility device has decreased; and
        set the target amount of the light of the light to a predetermined reference value without decreasing the target amount in response to the precipitation information indicating that a precipitation is greater than zero.

2. A digital micro-mirror device (DMD) lamp for a mobility device, comprising:
    a light source configured to irradiate light;
    a DMD module including (1) a plurality of mirrors configured to reflect the light irradiated from the light source to a lens and (2) an angle adjusting unit configured to adjust an angle of at least one of the plurality of mirrors to adjust a target amount of the light reflected to the lens; and a control unit configured to control the angle adjusting unit and the light source of the DMD module, wherein the control unit is configured to:
  receive environmental information; and
  calculate, based on the received environmental information, the target amount of the light reflected to the lens and a light transmission ratio at which the DMD module reflects the light irradiated from the light source to the lens,
wherein the DMD lamp further comprises a temperature sensor configured to sense a first temperature of the DMD module and a second temperature of the light source, and
wherein the control unit is further configured to control the DMD module and the light source based on at least one of the first temperature of the DMD module and the second temperature of the light source.

3. The DMD lamp of claim 2, wherein, in response to the first temperature of the DMD module exceeding a first reference temperature of the DMD module, the control unit is configured to:
  stop an operation of at least one of the DMD module and the light source; and
  generate a warning.

4. The DMD lamp of claim 2, wherein the control unit is configured to decrease the light transmission ratio and set the light transmission ratio to 50% in response to the first temperature of the DMD module being lower than or equal to a first reference temperature of the DMD module and higher than or equal to a second reference temperature of the DMD module, which is lower than the first reference temperature.

5. The DMD lamp of claim 2, wherein the control unit is configured to:
  set the light transmission ratio to be within an error range centered at 50% in response to (1) the first temperature of the DMD module being lower than or equal to a first reference temperature of the DMD module and higher than or equal to a second reference temperature of DMD module, which is lower than the first reference temperature of DMD module, and (2) the second temperature of the light source being lower than or equal to a reference temperature of the light source; and
  adjust the target amount to be constant regardless of a change to the light transmission ratio.

6. The DMD lamp of claim 2, wherein the control unit is configured to:
  set the light transmission ratio to be within an error range including 50% in response to (1) the first temperature of the DMD module being lower than or equal to a first reference temperature of the DMD module and higher than or equal to a second reference temperature of the DMD module, which is lower than the first reference temperature of DMD module, and (2) the second temperature of the light source exceeding a reference temperature of the light source,
  adjust the target amount to be maintained or decreased stepwise, and
  generate a warning.

7. The DMD lamp of claim 2, further comprising an active heat dissipation unit configured to dissipate a heat from the DMD module,
  wherein the control unit is further configured to control the active heat dissipation unit to lower the first temperature of the DMD module to be lower than a reference temperature of the DMD module in response to the first temperature of the DMD module being higher than or equal to the reference temperature of DMD module.

8. The DMD lamp of claim 2, wherein the control unit is further configured to:
  monitor the second temperature of the light source in response to the second temperature of the light source exceeding a reference temperature of the light source; and
  reduce an amount of a current applied to the light source stepwise to maintain the second temperature of the light source to be lower than or equal to the reference temperature of the light source.

9. A method of controlling a digital micro-mirror device (DMD) lamp for a mobility device, the DMD lamp including (1) a light source configured to irradiate light and (2) a DMD module including a plurality of mirrors configured to reflect the light irradiated from the light source to a lens, the method comprising:
  receiving environmental information including at least one of access information of an external object, external illuminance information, moving speed information of the mobility device, location information of the mobility device, road information, precipitation information, and road surface information;
  setting a target amount of the light reflected to the lens;
  setting a light transmission ratio of each mirror of the DMD module;
  receiving a first temperature of the light source and a second temperature of the DMD module; and
  controlling the light source and the DMD module to adjust the first and second temperatures in response to at least one of the first and second temperatures exceeding a first reference temperature of the DMD module or being within a predetermined error range including the first reference temperature of the DMD module,
  wherein controlling the DMD module comprises adjusting an angle of at least one of the plurality of mirrors in response to the second temperature being within the predetermined error range.

10. The method of claim 9, wherein controlling the light source and the DMD module comprises, in response to the second temperature of the DMD module exceeding a first reference temperature of DMD module, performing:
  blocking a current applied to the light source or the DMD module; and
  generating a warning.

11. The method of claim 9, wherein controlling the light source and the DMD module comprises adjusting the light transmission ratio of the DMD module to be within the predetermined error range centered at 50% in response to the second temperature of the DMD module being lower than or equal to a first reference temperature of the DMD module and higher than or equal to a second reference temperature of the DMD module, which is lower than the first reference temperature of DMD module.

12. The method of claim 11, wherein controlling the light source and the DMD module further includes adjusting the target amount to maintain an amount of the light reflected to the lens in response to the first temperature of the light source being lower than or equal to a reference temperature of the light source.

13. The method of claim 9, wherein controlling the light source and the DMD module further includes lowering the second temperature of the DMD module to be lower than a reference temperature of the DMD module in response to the second temperature of the DMD module being higher than or equal to the reference temperature of the DMD module.

14. The method of claim 9, wherein controlling the light source and the DMD module further includes, in response to the first temperature of the light source exceeding a reference temperature of the light source, performing:
  generating a warning;
  lowering an amount of a current of the light source; and
  receiving the first temperature of the light source at the lowered amount of current, and
  wherein generating the warning, lowering the amount of the current of the light source and receiving the first temperature of the light source at the lowered amount of current are repeated until that the first temperature of the light source is lower than or equal to the reference temperature of the light source.

* * * * *